United States Patent Office 2,806,833
Patented Sept. 17, 1957

2,806,833
PROMOTING REACTION OF BUTYL RUBBER AND CARBON BLACK WITH HALOGEN

Harold M. Leeper, Charleston, W. Va., assignor to Monsanto Chemical Company, St. Louis, Mo., a corporation of Delaware No Drawing. Application September 26, 1955,
Serial No. 536,741

6 Claims. (Cl. 260—41.5)

The present invention is directed to improvements in the heat processing of Butyl rubber containing a high proportion of carbon black. The invention is particularly directed to treating Butyl rubber prior to the vulcanizing operation.

Butyl rubber is obtained by the copolymerization of isobutylene with one or more diolefin hydrocarbons. It does not contain more than about 15% of combined diolefin hydrocarbon. Heating mixtures of Butyl rubber and carbon black increases the modulus and lowers the torsional hysteresis of the vulvanizates. It is an object of the present invention to provide a process of promoting the heat treatment of Butyl rubber-carbon black mixtures. A further object is to provide a chemical promoter which improves the properties of Butyl rubber. A specific object is to provide a chemical promoter which imparts higher modulus and lower torsional hysteresis of Butyl rubber than obtainable in their absence. Another object is to provide improved Butyl rubber vulcanizates. Other objects will be apparent from the description following.

In accordance with the present invention it has been discovered that the properties of Butyl rubber are significantly improved by incorporating carbon black together with a halogen, preferably iodine, and heating. The proportion of carbon black should be at least 25 parts per hundred parts of Butyl rubber and usually within the range of 25–60 parts carbon black. Heating should be above 250° F. and preferably 300–370° F. with heating times ranging from 2 to 16 hours. The compositions are masticated either during or after the heat treatment. The useful range or proportion of halogen is for most purposes 0.1 to 0.75 part per hundred parts of Butyl rubber. The optimum is usually about 0.5 part.

As specific embodiments of the invention Butyl rubber compositions were compounded comprising 100 parts by weight of Butyl rubber and 50 parts by weight of carbon black. The Butyl rubber employed in these compositions was GR-1 17 (1.48% unsaturation, M. W. 445,000) and the carbon black was Philblack O, a high abrasion furnace black. Various percentages of iodine were added to these Butyl rubber compositions and the compositions heated for 4 hours in an oven at 302° F., then masticated on a mill and vulcanizable stocks prepared by adding to the bases zinc oxide 5, tetramethyl thiuram disulfide 1, 2,2'-dithio-bis-benzothiazole 1 and sulfur 2. The compositions were then vulcanized by heating in a press for 45 minutes at 291° F. The modulus and tensile properties obtained with the various percentages of iodine as compared to those exhibited in the absence of iodine together with the torsional hysteresis are set forth below:

Table I

| Iodine percent on butyl rubber | Modulus of elasticity in lbs./in.² at elongation of 300% | Tensile at break in lbs./in.² | Ult. elong., percent | Torsional hysteresis |
|---|---|---|---|---|
| None | 1,600 | 2,640 | 520 | 0.412 |
| 0.17 | 1,720 | 2,660 | 490 | 0.381 |
| 0.33 | 1,940 | 2,780 | 480 | 0.341 |
| 0.66 | 1,990 | 2,880 | 460 | 0.272 |

The torsional hysteresis was determined at room temperature with an apparatus which consists essentially of a torsion pendulum. The sample of rubber tested supplies the force to restore the pendulum when it is deflected. The logarithm decrement of the observed amplitude is recorded.

While iodine is outstanding, chlorine, bromine, fluorine, mixtures and combinations thereof promote the reaction between carbon black and Butyl rubber. As further examples of the invention other halogens were substituted in the same Butyl rubber base, the compositions heated for 4 hours in an oven at 302° F. and vulvanizable stocks prepared as described above. The modulus and tensile properties as well as the torsional hysteresis of the compositions are set forth in Table II. In this instance 0.5% on the rubber of the various halogens was used.

Table II

| Halogen employed | Modulus of elasticity in lbs./in.² at elongation of 300% | Tensile at break in lbs./in.² | Ult. elong., percent | Torsional hysteresis |
|---|---|---|---|---|
| None | 1,440 | 2,310 | 480 | 0.402 |
| Bromine | 1,610 | 2,470 | 460 | 0.396 |
| Iodine monochloride | 2,000 | 2,900 | 440 | 0.223 |

It is intended to cover all changes and modifications of the examples of the invention herein chosen for purposes of disclosure which do not constitute departures from the spirit and scope of the invention.

What is claimed is:

1. A process which comprises heating a rubbery copolymer of at least 85% isobutylene and a minor amount of a conjugated diene hydrocarbon with a relatively large amount of carbon black and a small amount sufficient to increase the modulus and lower the torsional hysteresis of the vulcanizate of a halogen at 250–370° F. and then masticating the mixture.

2. A process which comprises heating a rubbery copolymer of at least 85% isobutylene and a minor amount of a conjugated diene hydrocarbon with a relatively large amount of carbon black and 0.1 to 0.75 part per hundred of the copolymer of a halogen at 300–370° F. and then masticating the mixture.

3. A process which comprises heating a rubbery copolymer of at least 85% isobutylene and a minor amount of a conjugated diene hydrocarbon with a relatively large amount of carbon black and a small amount sufficient to increase the modulus and lower the torsional hysteresis of the vulcanizate of iodine at 250–370° F. and then masticating the mixture.

4. A process which comprises heating a rubbery copolymer of at least 85% isobutylene and a minor amount of a conjugated diene hydrocarbon with a relatively large amount of carbon black and 0.1 to 0.75 part per hundred of the copolymer of iodine at 300–370° F. and then masticating the mixture.

5. A process which comprises heating a rubbery copolymer of at least 85% isobutylene and a minor amount of a conjugated diene hydrocarbon with a relatively large amount of carbon black and a small amount sufficient to increase the modulus and lower the torsional hysteresis of the vulcanizate of iodine monochloride at 250–370° F. and then masticating the mixture.

6. A process which comprises heating a rubbery copolymer of at least 85% isobutylene and a minor amount of a conjugated diene hydrocarbon with a relatively large amount of carbon black and 0.1 to 0.75 part per hundred of the copolymer of iodine monochloride at 300–370° F. and then masticating the mixture.

No references cited.